Oct. 23, 1956  G. L. GISONNO ET AL  2,767,937
LEVEL WINDER FOR REELING MACHINE
Filed April 2, 1954  2 Sheets-Sheet 1

INVENTORS
GEORGE L. GISONNO
HOWARD L. KITTS
BY
Harry M. Saragovitz
ATTORNEY

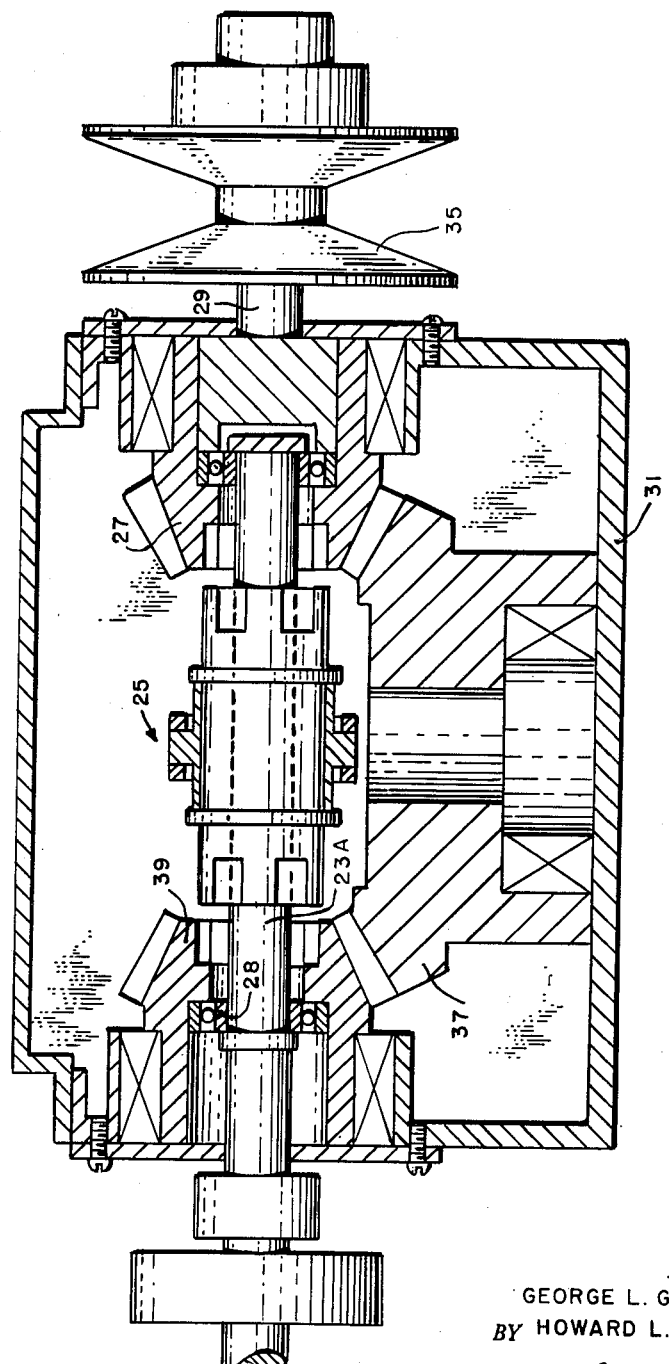

United States Patent Office 2,767,937
Patented Oct. 23, 1956

2,767,937

LEVEL WINDER FOR REELING MACHINE

George L. Gisonno, Brooklyn, N. Y., and Howard L. Kitts, Elberon, N. J., assignors to the United States of America as represented by the Secretary of the Army Application April 2, 1954, Serial No. 420,765

1 Claim. (Cl. 242—158)

(Granted under Title 35, U. S. Code (1952), sec. 266)

The invention described herein may be manufactured and used by or for the Government for governmental purposes, without the payment of any royalty thereon.

The present invention relates to a reeling machine for winding wire upon a reel automatically.

More specifically, the invention herein resides in an attachment for use in a reeling machine whereby the wire wound upon a reel can be wound in a level fashion.

In the winding of cable, such as metallic wire, upon a reel it is desirable at all times that the cable be wound upon the reel in successive level layers to prevent snarling of the cable on the reel. To accomplish this it was necessary for a man to handfeed the cable to the reel as it was being rotated either by hand or motor driven. Obviously such method of winding cable was costly in utilizing manpower that might otherwise be used.

To this end, it is an object of this invention to provide a means for enabling the level winding of wire upon a reel wherein such winding is accomplished automatically and in unison with the operation of the reel.

An important feature of the invention is the inclusion of means in said level winding device whereby winding of wire can be accomplished on reels of varying sizes by the utilization of hereinafter described limit fingers.

Other features of the invention will be more apparent as the description of the invention is set forth, taken in view of the accompanying drawings in which:

Figure 3 is a sectional view of the gearing mechanism taken on the line 3—3 of Figure 2.

Figure 1:
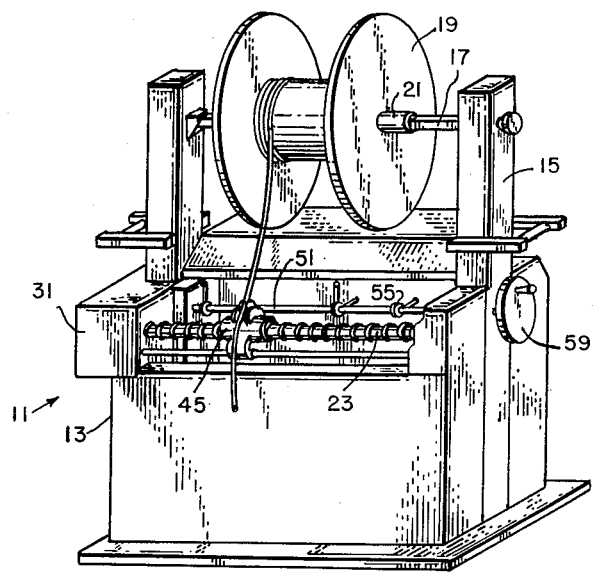
Figure 1 is a view in perspective of a cable reeling machine and incorporating the level winder of the present invention.

Referring to the drawings, there is shown in Figure 1 a cable reeling machine 11 which comprises in part a framework 13 having a pair of spaced mutually opposing uprights 15. Intermediate the uprights 15 and extending therethrough is a shaft 17 upon which a reel 19 can rotate. To prevent the reel 19 from undue horizontal movement in either direction, a pair of adjustable spacer blocks 21 is provided, one on either side of the reel 19. Accordingly, reels of different widths may be used upon which cable is to be wound. The cable winding machine described above is of conventional commercial manufacture wherein cable is hand-payed onto the reel as the reel is either hand or power driven.

Figure 2:
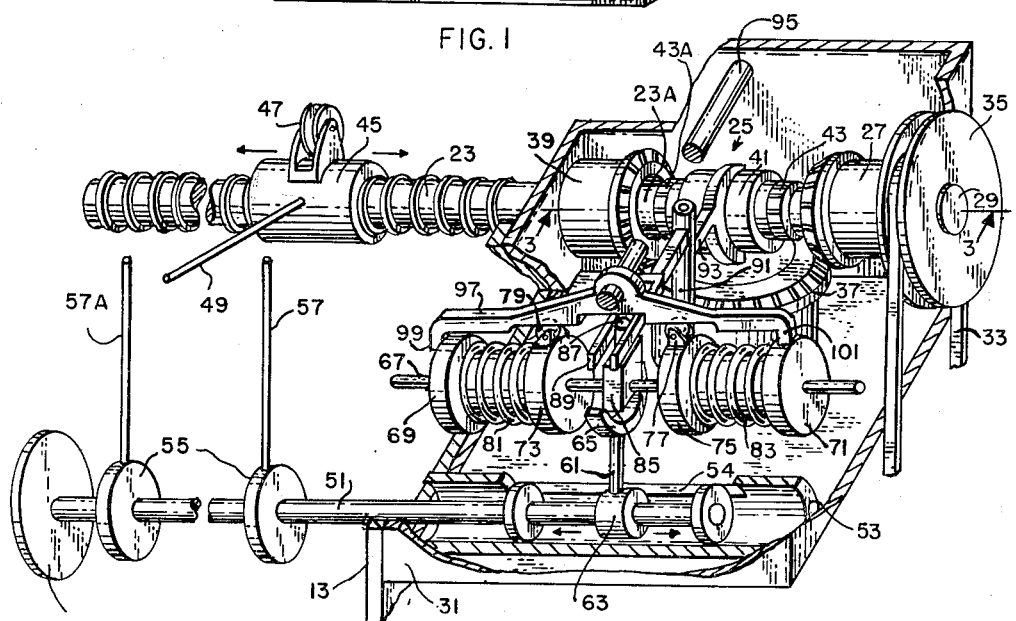
Figure 2 is a view in perspective, with a portion cut away of the reversing means of the level winder.

For a more detailed view of the components of the level winder, particular attention is directed to Figures 2 and 3 wherein there is shown a rotatable worm drive 23, one end of which is journaled in a bearing (not shown) in the framework 13, while the other end terminates in and forms part of a clutching means generally shown at 25 to effect rotation of worm drive 23 in either clockwise or counterclockwise direction as desired. The clutching means and part of the other components of the level winding means are enclosed in a housing 31 which forms part of the framework 13. That portion of the worm drive which is contained within the housing 31 and which is encompassed by clutching means 25 does not have the screwlike surface as shown on that portion of the worm drive which is outside of the housing but is provided with a smooth surface hereinafter designated as 23A. The clutching means 25 includes a dual bevel gear comprising a gear 27 affixed to a shaft 29 which is rotatably driven by means of a pulley 35 and a drive line 33 which in turn is driven by a motor (not shown). Drive line 33 driven by the motor rotates pulley 35 which, by being affixed to shaft 29 rotates said shaft thereby effecting rotation of gear 27. The rotational movement of gear 27 is imparted to an intermediate gear 37 which drives a gear 39 freely mounted on worm shaft 23A. By this arrangement the direction of rotation of gear 39 will always be opposite to that of gear 27. Both gears 27 and 39 in addition to being provided with circumferential cogs or teeth as shown in Figure 2 are also provided with gear teeth which extend axially a short distance into the respective inner peripheral surface of each gear. Intermediate the gears 27 and 39, and splined to the extended shaft 23A is a collar 41 which is longitudinally slidable on the shaft 23A. Each end of the collar 41 is provided on its outer peripheral surface with a set of cogs or teeth 43, 43A which can separately engage or mesh the gear teeth in the inner peripheral surfaces of gears 39 and 27 respectively. From the description of the clutching mechanism it is apparent that, in a situation where collar 41 is not in engagement with either of said gears 39 or 27, shaft 29 will rotate gear 27 in one direction and gear 39 will rotate in a direction opposite to that of gear 27. As indicated, since gear 27 is independent of shaft 23A and gear 39 is freely mounted on shaft 23A, no rotation of the worm drive 23 is effected. However, as soon as collar 41 is moved either to the left or right, by means hereinafter described, rotation of shaft 23A and worm drive 23 will be accomplished in one desired direction. If moved to the right, for example, the shaft 23A will be rotated in the same direction as gear 27 while gear 39 will revolve free of the shaft by means of its being mounted in a bearing 28. If, however, the collar 41 is moved to the left the shaft 23A will assume the direction of rotation of gear 37 which is opposite to that described immediately above, and gear 27 will rotate free of the shaft 23A.

Mounted on the worm drive 23 and threadably engaged therewith is a traverse 45 in the form of an internally screw-threaded collar which will be moved on the worm drive 23 as said drive is rotated. On the outer peripheral surface of the traverse 45 are securely affixed a wire guide roller 47 and a radially disposed arm 49 which is spaced about 90° from the guide 47.

Spaced from and in axial alignment with the worm drive 23 is a shiftable shaft 51 one end of which is journaled in a bushing in the framework 13, while the other end is supported in tubular collar 53 provided with a longitudinal slot 54. Rigidly secured to the shaft 51 are a plurality of spaced mounts 55, each of which has affixed thereto a radially extending limit stop finger 57. The limit fingers 57 and the manner in which they are arranged on the shaft 51 form an important feature of this invention. The limit fingers are positioned in the following manner. Two such fingers in parallel alignment in a determinate spaced relationship from each other extend radially from the shaft 51. Any number of such similar pairs of limit fingers may be installed circumferentially about the shaft 51; however each pair of fingers is angularly displaced from any other pair on the shaft. It is thus apparent that if the shaft 51 is rotated any one pair of limit fingers can be raised into operative position, that is, in such position that it will serve to limit the travel of arm 49 on traverse 45. Rotation of the shaft 51 is accomplished by a handle 59 located outside of the framework 13. The spacing between the fingers of any one pair is fixed and determined by the width of any particular reel such as 19 upon which the cable is to be wound.

Extending radially from the shaft 51 confined in collar 53 within housing 31 is a support 61, one end of which is rigidly held in a mount 63 which in turn is affixed to the shaft 51. The other end of support 61 terminates in a substantially U-shaped yoke 65.

Within the housing 31 and intermediate the shafts 51 and 23A, and in axial alignment therewith, is a second longitudinally shiftable shaft 67 which is freely mounted in bushings provided in the side walls of the housing 31. Mounted proximal to either end of shaft 67 is a pair of plates 69, 71, each of which is rigidly affixed thereto. Intermediate the fixed plates 69, 71 is a pair of spaced longitudinally movable plates 73, 75 which are freely mounted on the shaft 67. Each of the plates 73, 75 is provided on its outer periphery with a bracket 77 having a roller 79 extending upwardly therefrom.

Intermediate the plates 69 and 73 is a coil spring 81 while intermediate the plates 71 and 75 is a coil spring 83. Intermediate the movable plates 73 and 75, and rigidly affixed to the shaft by means of a set screw or the like, is a support 85 which is provided with an upwardly disposed pivot pin 87. The pin 87 serves as a pivot point about which a fork 89 is swingable or pivotable, said fork being held in a substantially horizontal plane relative to the vertically disposed pin 87. The fork 89 is connected to an upright pivotably mounted post 91 which may be suitably positioned within housing 31. Extending perpendicularly from the post 91 and substantially in alignment with the fork 89 is a rod 93 which at its other end is terminated in a substantially U-shaped clamp which engirdles the clutch collar 41 and is rigidly affixed thereto.

Extending between the end walls of the housing 31 and spaced from clutching means 25 is a fixed shaft 95 shown partially in Figure 2. The shaft 95 serves as a means of supporting a pivotable rocker locking arm 97 which is provided with a centrally disposed hub portion through which the shaft 95 extends and about which the arm 97 pivots. The arm 97 is substantially U-shaped in cross-section and is so positioned on the shaft 95 as to be directly over the shaft 67 and consequently over the fixed plates 69, 71 and movable plates 73, 75 whereby the rollers 79 on plates 73, 75 ride in the channel of arm 97. The arm 97 is further characterized by having a step formation on its inner periphery along either side of the hub portion and in which the rollers 79 ride. By such step formation, the arm 97 can be slightly raised depending upon whether plate 73 or 75 is moved. At either end, the arm 97 terminates in downwardly disposed end flanges 99, 101 which engage the fixed plates 69 and 71 respectively.

The operation of the level winder hereinbefore described is as follows with particular reference to Figure 2: With the clutch collar 41 in engagement with gear 39, clockwise rotation of both gear 39 and worm drive 23 will be effected. As the worm drive rotates clockwise, the traverse 45 will move to the left. Such movement of the traverse will continue until the protruding arm 49 of traverse 45 strikes the limit arm 57A on shaft 51. Further movement of the traverse 45 against the limit finger 57A will effect longitudinal movement of the shaft 51 to the left. As the shaft 51 moves to the left, the movable plate 73 will be moved in the same direction, being so urged by yoke 65. Such movement of the plate 73 will compress spring 81 and, at the same time, roller 79 will ride upon the channelled arm until the stepdown portion is reached. At such time the arm will be urged upwardly and become disengaged from the fixed plate 69. Simultaneously the shaft 67 will be urged to the left and fork 89 will pivot about the pin 87 on supporting plate 85 affixed to the shaft 67. Such motion of the fork 89 will be transferred to the pivotable shaft 91 and in turn to the rod 93, whereby the clutch collar 41 will be urged to the right and into engagement with the gear 27 and simultaneously clutch collar 41 will become disengaged from gear 39. As gear 27 is moving in counterclockwise rotation such movement is imparted to the worm drive 23 and the traverse 45 will move to the right. Such movement of the traverse to the right will continue until limit finger 57 is reached and the direction of movement is again reversed as set forth above. As cable is being fed over guide 47, it is apparent that as traverse 45 moves in successive opposite directions the cable will be uniformly wound upon the reel in stacked level layers. In the operation of the cable reeling machine described herein some source of power is utilized in rotating shaft 17 and reel 19. The same power means that is used to work the level winder, that is, the drive line 33, may be utilized for that purpose, or any independent power means may be used.

While there has been herein described but one embodiment of the invention, it is apparent that modifications and changes may be made without departing from the spirit and scope of the invention as defined in the accompanying claim.

What is claimed is:

In a cable reeling machine including a reel for receiving said cable, means for winding said cable on said reel in successive level winds comprising a worm drive, means for effecting rotation of said worm drive in either direction including a shiftable clutch collar on said worm adapted for separate engagement into either one of a pair of gears on said shaft having opposite rotational movements whereby said worm drive may be rotated in either direction, a cable guide traversable on said worm drive having an arm extending therefrom, a first shiftable shaft spaced from and substantially parallel to said worm drive, a plurality of spaced limit means on said shaft for arresting the movement of said traversable guide in its movement along said worm drive, and a second shiftable shaft intermediate said first shaft and said clutch, said second shaft having mounted thereon first and second fixed plates respectively affixed adjacent to the ends of said shaft, a pair of movable plates intermediate said fixed plates and spring means intermediate each of said fixed and movable plates, each of said movable plates having a roller mounted on the peripheral surface thereof and operatively associated with a substantially U-shaped unitary locking arm pivotable about its mid-portion on a shaft supported by said machine, said locking arm terminating in discrete depending flanges which alternately engage either one of said fixed plates, a first linking means intermediate said first and second shafts for urging either one of said movable plates on the second shaft toward its respective adjacent fixed plate for disengaging said locking arm from either one of said fixed plates whereby said shaft is moved longitudinally, a second linking means intermediate said second shaft and said clutch collar whereby as said second shaft is moved in either direction said clutch collar is urged into engagement with either one of said gears for effecting rotation of said worm drive.

References Cited in the file of this patent

UNITED STATES PATENTS

| | | |
|---|---|---|
| 762,838 | Norton | June 14, 1904 |
| 1,129,762 | Townsend | Feb. 23, 1915 |
| 1,338,086 | Kendall | Apr. 27, 1920 |
| 2,030,988 | Hofstetter | Feb. 18, 1936 |
| 2,306,045 | Delano | Dec. 22, 1942 |
| 2,407,542 | Ewaldson | Sept. 10, 1946 |